E. S. HUFF.
Cultivator.
No. 29,789. Patented Aug. 28, 1860.
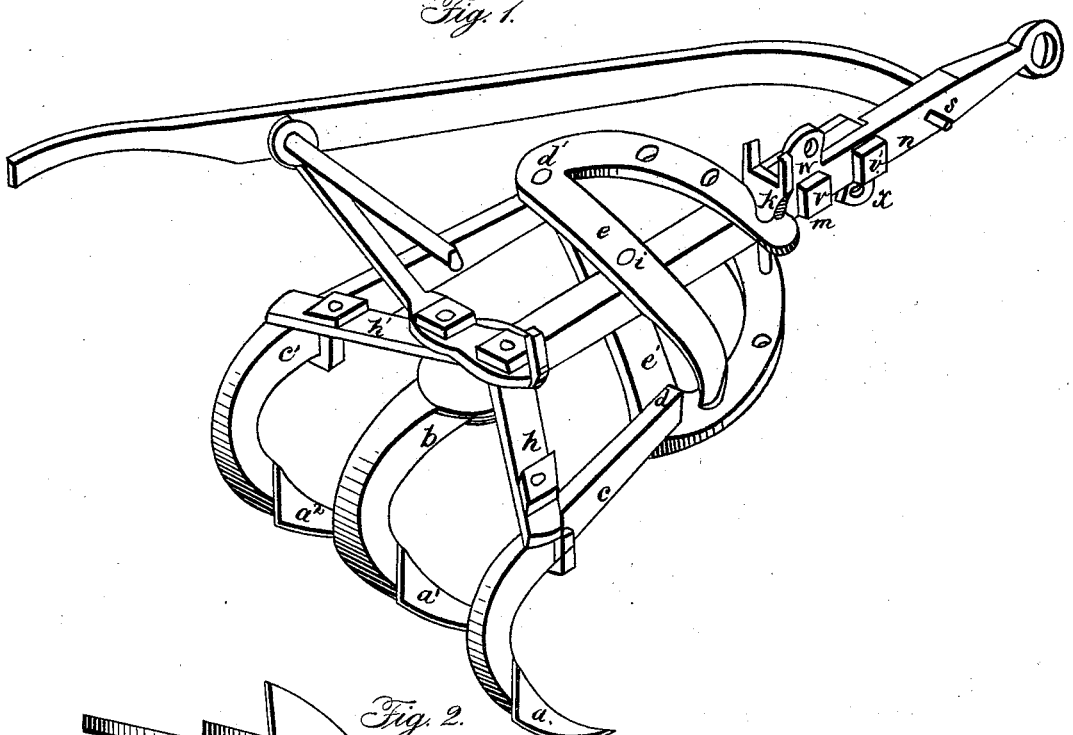
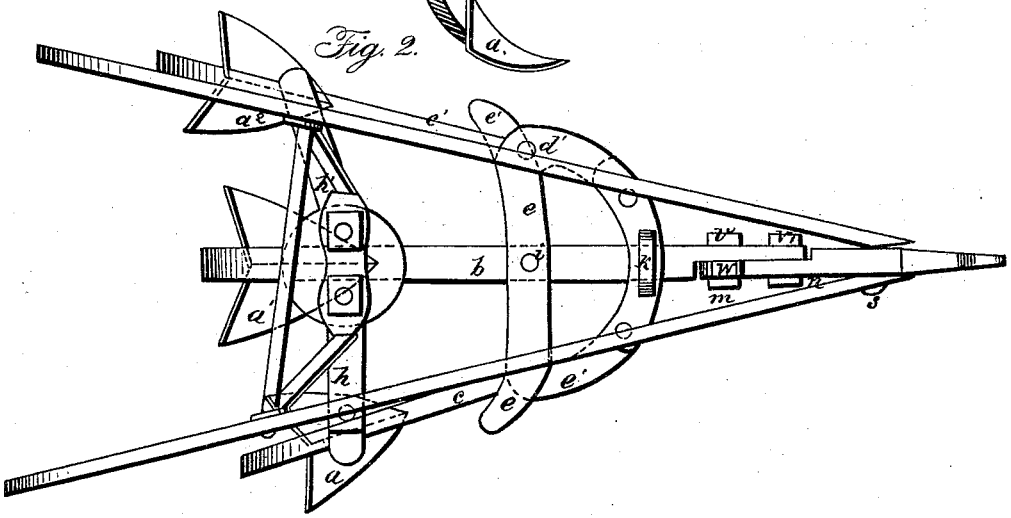
Witnesses:
Chas. G. Page
Wm. H. Harrison
Inventor:
Enoch. S. Huff.

UNITED STATES PATENT OFFICE.

ENOCH S. HUFF, OF ZANESVILLE, OHIO.

IMPROVEMENT IN CULTIVATORS.

Specification forming part of Letters Patent No. 29,789, dated August 28, 1860.

*To all whom it may concern:*

Be it known that I, ENOCH S. HUFF, of Zanesville, in the county of Muskingum and State of Ohio, have invented an Improvement in Shovel-Plows; and I do hereby declare that the following is a full, clear, and exact description of the principle or character which distinguishes it from all other things before known, and of the usual manner of making, modifying, and using the same, reference being had to the accompanying drawings, of which—

Figure 1 is a perspective view of the plow, and Fig. 2 a top view of the same.

My invention consists in an improvement in shovel-plows, described and represented as follows:

I use two, three, or more shovels, $a$, but prefer three, and their form may be such as any of those in common use. Ordinarily in shovel plows and cultivators the frames are made so as to expand and contract by a radial movement of the arms or parts of the frame to which the shovel or teeth are attached. This alters, of necessity, the set of the teeth, and, moreover, they cannot take any other position than in the arc of the circle in which they move.

By the following mode of connecting the shovels it will be seen that a great variety of positions and arrangements of the shovels can be obtained.

The center shovel, $a'$, is fixed to the center beam, $b$. The side shovels, $a\ a^2$, are attached to short side beams, $c\ c'$, and these are pivoted at $d\ d'$ to curved segmental arms $e\ e'$, which vibrate about a common axis, $i$. These arms are perforated with numerous holes, which pass across a hole in the beam $b$, and as these arms are shifted by turning them around the pivot $i$ they are secured in place by the key $k$, which in Fig. 1 is shown out of place for convenience of illustration. The arms $c\ c'$ are also pivoted to cross-beams $h\ h'$, which beams are also pivoted to the main beam $b$.

By virtue of the two pivoted connections with the main frame $b$ the beams $c\ c'$ and plows may be shifted into a great variety of positions in relation to the center beam, $b$. The three plows may be ranged in lines at right angles or diagonal to the main beam and in all intermediate positions, and the plows $a\ a^2$ may occupy different positions each in relation to the main beam, adapting the implement to all the varying necessities of soil, crops, and culture. The clevis is of peculiar construction, having two points of adjustment, $m$ and $n$. The plow-handles are secured to the clevis at $s$, and the clevis is "halved on" with the beam, so as not to increase the width of the beam at this point, and secured to the beam by the screw-bolts $v\ v'$. The rear end of the clevis is bent at right angles, or nearly so, to form the adjusting-arc $w$, and the forward end of the beam is formed, in a similar manner, into an arc, $x$. These arcs are provided with holes, and the clevis may be adjusted up or down by either arc by withdrawing and inserting the screw-bolts $v\ v'$; or a double adjustment may be made by the two joints, so as to command any desirable position for draft and regulation of the depth to which the plows are to be worked.

What I claim is—

The combination of the segmental arcs $e\ e'$, plow-beams $b\ c\ c'$, and pivoted cross-beams $h\ h'$, substantially in the manner and for the purposes hereinabove set forth.

ENOCH S. HUFF.

Witnesses:
CHAS. G. PAGE,
WM. H. HARRISON.